United States Patent Office.

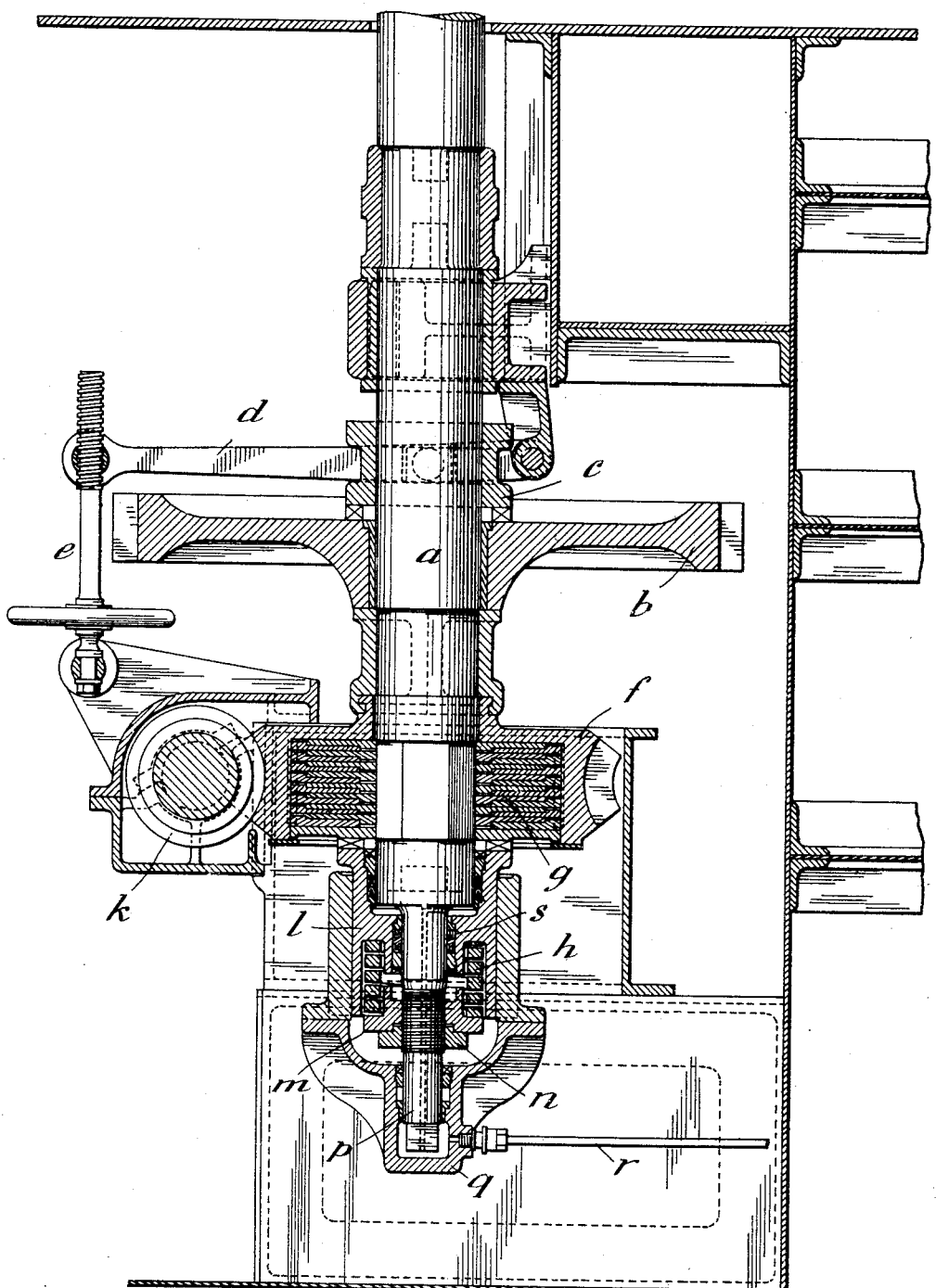

JAMES HORNE, OF BARROW-IN-FURNESS, ENGLAND, ASSIGNOR TO THE VICKERS, SONS & MAXIM, LIMITED, OF SHEFFIELD, ENGLAND.

ROTATING AND BRAKING MECHANISM FOR TURRETS, &c.

SPECIFICATION forming part of Letters Patent No. 630,228, dated August 1, 1899.

Application filed May 20, 1899. Serial No. 717,605. (No model.)

*To all whom it may concern:*

Be it known that I, JAMES HORNE, engineer, a citizen of England, residing at Vickers, Sons & Maxim, Limited, Works, Barrow-in-Furness, in the county of Lancaster, England, have invented certain new and useful Improvements in the Rotating and Braking Mechanism of Heavy Turn-Tables or Turrets, (for which application for a patent has been made in Great Britain, dated October 18, 1898, No. 21,946,) of which the following is a specification.

This invention relates to rotating and braking mechanism of heavy turn-tables or turrets which is arranged in such a manner that the rotating mechanism can be worked either by hand or by hydraulic engines and that when required it can operate as a brake, as will be described with reference to the accompanying drawing, which is a vertical section of the gear on the vertical shaft, having on its upper end a pinion for rotating the turn-table or turret in the known manner. On this shaft $a$ there is fitted free to revolve a toothed wheel $b$, which can be clutched to the shaft $a$ by means of a clutch $c$, worked by a lever $d$, screw, and hand-wheel $e$. There is also fitted free on the shaft $a$ a worm-wheel $f$, having a hollow boss, in which are a number of friction-plates $g$. All the odd plates are notched internally to slide along keys on the shaft $a$, and all the even plates are notched externally to slide along keys within the boss of the wheel $f$. The plates are pressed into close contact by a spring $h$. A worm $k$ gears with the worm-wheel $f$, the pitch being such that the wheel cannot drive the worm. The lower end of the shaft $a$ has on it a sleeve $l$, containing the spring $h$, the lower end of which bears on a collar $m$, screwed on the shaft and secured by a lock-nut $n$. Below the nut $n$ the shaft $a$ has a reduced part $p$, which extends into a cavity in the lower part of a casing $q$, this cavity communicating by a pipe $r$ with a valve connected to the cylinders of the hydraulic engine, which by suitable gear works the toothed wheel $b$. The worm $k$ is on a shaft worked by any suitable hand-gear.

The lower part of the shaft $a$ is bored upward to a point above cup-leathers $s$, where there is a cross-bore, so that liquid under pressure supplied by the pipe $r$ can act as in a hydraulic press, pushing down the sleeve $l$ and the springs $h$, and so relieving the frictional pressure of the plates $g$.

The operation of the apparatus is as follows: When the shaft $a$ is worked by the hydraulic engine driving the wheel $b$, then that wheel is clutched to the shaft $a$, and the hydraulic pressure which works the engine being communicated through the pipe $r$ causes release of the friction-plates $g$, so that they do not tend to drive the worm-wheel $f$. When the shaft $a$ is worked by hand-gear driving the worm $k$, then the wheel $b$ is unclutched, and there being no pressure communicated through the pipe $r$ the friction-plates are pressed into close contact by the spring $h$, so that they clutch the worm-wheel $f$ to the shaft $a$. As the wheel $f$ is held stationary by the worm $k$ when that worm is stationary, the friction-plates $g$ operate as a brake, preventing the shaft $a$ from revolving, and consequently holding stationary the turret or turn-table, which is geared to the shaft $a$. As this gearing, as well as the hydraulic engine and its gearing to the wheel $b$, and the hand-gear for working the worm $k$ are all of ordinary known construction and arrangement, I have not shown them in the drawing and I make no claim in respect of them; but, Having described the nature of this invention and the best means I know of carrying the same into practical effect, I claim—

In combination with the vertical shaft employed for rotating a turn-table or turret, a wheel adapted to be worked by a hydraulic engine, and means of clutching it to the shaft, a worm-wheel gearing with a worm adapted to be worked by hand-gear, a set of friction-plates and a spring adapted to clutch the worm-wheel to the shaft, and a cavity around the shaft connected by a pipe to the supply-valve of the hydraulic engine, substantially as and for the purpose set forth.

In testimony whereof I have hereunto set my hand in presence of two subscribing witnesses.

JAMES HORNE.

Witnesses:
F. T. HANDY,
WM. BERESFORD.